(12) United States Patent
Bossetti et al.

(10) Patent No.: US 9,537,353 B1
(45) Date of Patent: Jan. 3, 2017

(54) METHODS FOR DETECTING MATED COILS

(71) Applicant: APPLE INC., Cupertino, CA (US)

(72) Inventors: Chad A. Bossetti, Cupertino, CA (US);
Jeffrey M. Alves, Cupertino, CA (US);
Albert J. Golko, Cupertino, CA (US);
Jeffrey J. Terlizzi, Cupertino, CA (US);
Christopher S. Graham, Cupertino, CA (US); Steven G. Herbst, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 14/295,249

(22) Filed: Jun. 3, 2014

(51) Int. Cl.
*H02J 17/00* (2006.01)
*H04B 5/00* (2006.01)

(52) U.S. Cl.
CPC .................................... *H02J 17/00* (2013.01)

(58) Field of Classification Search
CPC ........................................................ H04B 5/00
USPC .......................................................... 307/104
See application file for complete search history.

(56) References Cited

U.S. PATENT DOCUMENTS

| | | | |
|---|---|---|---|
| 4,268,899 A | 5/1981 | Rokas | |
| 5,293,308 A | 3/1994 | Boys et al. | |
| 6,960,968 B2 | 11/2005 | Odendaal et al. | |
| 6,972,543 B1 | 12/2005 | Wells | |
| 7,948,208 B2 | 5/2011 | Partovi et al. | |
| 7,952,322 B2 | 5/2011 | Partovi et al. | |
| 8,054,651 B2 | 11/2011 | Pollard | |
| 8,169,151 B2 | 5/2012 | Kimura | |
| 8,169,185 B2 | 5/2012 | Partovi et al. | |
| 8,274,178 B2 | 9/2012 | Tucker | |
| 8,278,784 B2 | 10/2012 | Cook et al. | |
| 8,362,744 B2 | 1/2013 | Terao et al. | |
| 8,421,274 B2 | 4/2013 | Son et al. | |
| 8,629,652 B2 | 1/2014 | Partovi et al. | |

(Continued)

FOREIGN PATENT DOCUMENTS

| | | |
|---|---|---|
| CN | 1826715 | 8/2006 |
| CN | 102124624 | 7/2011 |

(Continued)

OTHER PUBLICATIONS

U.S. Appl. No. 14/837,965, filed Aug. 27, 2015, Heresztyn et al.

(Continued)

*Primary Examiner* — Robert Deberadinis
(74) *Attorney, Agent, or Firm* — Brownstein Hyatt Farber Schreck, LLP

(57) ABSTRACT

Methods and systems for improved efficiency when an inductive power transmitter associated with an inductive power transfer system experiences a low-load or no-load condition. More particularly, methods and systems for detecting when an inductive power receiver is absent or poorly connected to an inductive power transmitter. The inductive power transmitter includes, in one example, a current peak monitor coupled to an inductive power transmit coil. The current peak monitor waits for a current peak resulting from spatial displacement of a magnetic field source within the inductive power receiver, indicating to the inductive power transmitter that the inductive power receiver is moving, or has moved, toward the inductive power transmitter. Other examples include one or more Hall effect sensors within the inductive power transmitter to monitor for the magnetic field source of the inductive power receiver.

19 Claims, 11 Drawing Sheets

(56) References Cited

U.S. PATENT DOCUMENTS

| | | | |
|---|---|---|---|
| 8,629,654 B2 | 1/2014 | Partovi et al. |
| 8,810,071 B2 | 8/2014 | Sauerlaender et al. |
| 8,884,469 B2 | 11/2014 | Lemmens |
| 8,947,047 B2 | 2/2015 | Partovi et al. |
| 9,030,421 B2 | 5/2015 | Tseng et al. |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,126,490 B2 | 9/2015 | Cook |
| 9,148,201 B2 | 9/2015 | Kallal et al. |
| 9,154,189 B2 | 10/2015 | Von Novak et al. |
| 9,178,369 B2 | 11/2015 | Partovi |
| 9,197,065 B2 | 11/2015 | Divan et al. |
| 9,197,070 B2 | 11/2015 | Jung |
| 9,270,138 B2 | 2/2016 | Yamakawa et al. |
| 9,276,437 B2 | 3/2016 | Partovi et al. |
| 9,352,661 B2 | 5/2016 | Keeling et al. |
| 9,356,659 B2 | 5/2016 | Partovi |
| 9,407,107 B2 | 8/2016 | Park et al. |
| 2010/0328044 A1 | 12/2010 | Waffenschmidt et al. |
| 2011/0050164 A1 | 3/2011 | Partovi et al. |
| 2011/0109264 A1 | 5/2011 | Choi |
| 2011/0136550 A1 | 6/2011 | Maugars |
| 2011/0198937 A1 | 8/2011 | Tseng |
| 2011/0221385 A1 | 9/2011 | Partovi |
| 2011/0234012 A1 | 9/2011 | Yi et al. |
| 2011/0241615 A1 | 10/2011 | Yeh |
| 2011/0254379 A1 | 10/2011 | Madawala |
| 2012/0068550 A1 | 3/2012 | Boer et al. |
| 2012/0146576 A1 | 6/2012 | Partovi |
| 2012/0313577 A1 | 12/2012 | Moes et al. |
| 2013/0093388 A1 | 4/2013 | Partovi |
| 2013/0093389 A1 | 4/2013 | Partovi |
| 2013/0099563 A1 | 4/2013 | Partovi et al. |
| 2013/0099735 A1 | 4/2013 | Partovi |
| 2013/0234532 A1 | 9/2013 | Fells et al. |
| 2013/0257168 A1 | 10/2013 | Singh |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2014/0015327 A1 | 1/2014 | Keeling et al. |
| 2014/0015522 A1 | 1/2014 | Widmer et al. |
| 2014/0103873 A1 | 4/2014 | Partovi et al. |
| 2014/0132210 A1 | 5/2014 | Partovi |
| 2014/0159656 A1 | 6/2014 | Riehl |
| 2014/0191568 A1 | 7/2014 | Partovi |
| 2014/0191818 A1 | 7/2014 | Waffenschmidt et al. |
| 2014/0225439 A1 | 8/2014 | Mao |
| 2014/0306654 A1 | 10/2014 | Partovi |
| 2014/0347007 A1 | 11/2014 | Kee et al. |
| 2015/0077045 A1 | 3/2015 | Harris |
| 2015/0130412 A1 | 5/2015 | Partovi |
| 2015/0207333 A1 | 7/2015 | Baarman et al. |
| 2015/0215006 A1 | 7/2015 | Mehas et al. |
| 2015/0244179 A1 | 8/2015 | Ritter et al. |
| 2015/0244341 A1 | 8/2015 | Ritter et al. |
| 2015/0333530 A1 | 11/2015 | Moyer et al. |
| 2015/0364931 A1 | 12/2015 | Ren et al. |
| 2016/0043567 A1 | 2/2016 | Matsumoto et al. |
| 2016/0064948 A1 | 3/2016 | Heresztyn et al. |
| 2016/0064992 A1 | 3/2016 | Herbst et al. |

FOREIGN PATENT DOCUMENTS

| | | |
|---|---|---|
| CN | 102257696 | 11/2011 |
| CN | 102355035 | 2/2012 |
| CN | 103457362 | 12/2013 |
| EP | 2642628 | 9/2013 |
| JP | H08331850 | 12/1996 |
| JP | 2010161882 | 7/2010 |
| JP | 2013183497 | 9/2013 |
| JP | 2013536664 | 9/2013 |
| KR | 20130055199 | 5/2013 |
| KR | 20140061337 | 5/2014 |
| WO | WO 2010/077991 | 7/2010 |
| WO | WO 2010/108191 | 9/2010 |
| WO | WO 2011/156555 | 12/2011 |
| WO | WO 2012/085119 | 6/2012 |

OTHER PUBLICATIONS

U.S. Appl. No. 14/628,897, filed Feb. 23, 2015, Ritter et al.
U.S. Appl. No. 14/627,957, filed Feb. 20, 2015, Ritter et al.
U.S. Appl. No. 14/795,723, filed Jul. 9, 2015, Herbst et al.
U.S. Appl. No. 14/290,411, filed May 29, 2014, Bossetti.
U.S. Appl. No. 14/449,075, filed Jul. 31, 2014, Ritter.
U.S. Appl. No. 14/304,064, filed Jun. 13, 2014, Moyer et al.

FIG. 1A  FIG. 1B

METHODS FOR DETECTING MATED COILS

TECHNICAL FIELD

Embodiments described herein relate to electromagnetic power transfer systems, and in particular to systems and methods for improving the efficiency of no- and low-load conditions of an inductive power transmitter.

BACKGROUND

Many electronic devices include one or more batteries that may require recharging from time to time. Such devices may include electric vehicles, cell phones, smart phones, tablet computers, laptop computers, wearable devices, navigation devices, sports devices, health devices, medical devices, location tracking devices, accessory devices, home appliances, peripheral input devices, remote control devices, and so on.

A number of battery-powered electronic devices may recharge internal batteries wirelessly by accepting inductive power provided by an inductive power transmitter. For instance, a battery-powered electronic device ("accessory") adapted to accept inductive power may be positioned on a surface of a transmitter ("dock") adapted to produce inductive power. In these systems, an electromagnetic coil within the dock ("transmit coil") may produce a time-varying electromagnetic flux to induce a current within an electromagnetic coil within the accessory ("receive coil"). The accessory may use the received current to replenish the charge of a rechargeable battery.

In many examples, a dock associated with an inductive power transfer system may consume substantial power when the accessory is absent.

Accordingly, there may be a present need for a system and method for efficiently, rapidly, and wirelessly delivering useful power to a battery-powered electronic device.

SUMMARY

Embodiments described herein may relate to, include, or take the form of methods and systems for managing the efficiency of an inductive power transmitter associated with an inductive power transfer system under no-load conditions. Such embodiments can include an inductive power transmitter and an inductive power receiver.

Certain embodiments described herein may relate to or take the form of a method of activating transmit circuitry associated with an inductive power transmission apparatus, the transmit circuitry including at least one transmit coil, the method including at least the steps of providing an interface surface for mating to an inductive power receiving apparatus, monitoring one or more proximity sensors for an indication of a proximity of the inductive power receiving apparatus to the interface surface, determining if the proximity of the magnetic field source may be at least lower than a selected threshold, verifying that the inductive power receiving apparatus may be ready to receive transmitted power, and thereafter activating the transmit circuitry.

Certain embodiments described herein may relate to or take the form of a method of activating transmit circuitry associated with an inductive power transmission apparatus, the transmit circuitry including at least one transmit coil, the method including at least the steps of providing an interface surface for mating to an inductive power receiving apparatus comprising at least one magnetic field source, monitoring with a processor one or more magnetic field sensors for an indication of a proximity of the magnetic field source, and activating the transmit circuitry in response to determining the proximity of the magnetic field source may be at least lower than a selected threshold.

Certain further embodiments described herein may relate to or take the form of a method of activating transmit circuitry associated with an inductive power transmission apparatus, the transmit circuitry including at least a transmit coil, the method including at least the steps of providing an interface surface for mating to an inductive power receiving apparatus comprising at least one magnetic field source, monitoring the transmit coil for a current spike, and activating the transmit circuitry in response to the current spike.

Other embodiments described herein may relate to an adaptive power control system for an electromagnetic induction power transfer apparatus. The electromagnetic induction power transfer apparatus may include at least a signal receiver, a sensor configured to detect the presence and absence of an electromagnetic induction power receiving apparatus, a power supply with an active state and an inactive state that is configured to switch between the active state and the inactive state at a selectable duty cycle, and a power-transmitting inductor coupled to the power supply. In such an embodiment, the inactive state of the power supply may be controlled at least in part in response to a signal received from the signal receiver, and the inactive state of the power supply may be controlled at least in part in response to a signal received from the sensor.

BRIEF DESCRIPTION OF THE FIGURES

Reference will now be made to representative embodiments illustrated in the accompanying figures. It should be understood that the following descriptions are not intended to limit the disclosure to one preferred embodiment. To the contrary, it is intended to cover alternatives, modifications, and equivalents as may be included within the spirit and scope of the described embodiments as defined by the appended claims.

FIG. 1A depicts a front perspective view of an example inductive power transfer system in an unmated configuration.

FIG. 1B depicts a front perspective view of an example inductive power transfer system in an alternate unmated configuration.

The use of the same or similar reference numerals in different drawings indicates similar, related, or identical items.

DETAILED DESCRIPTION

Figure 1C:
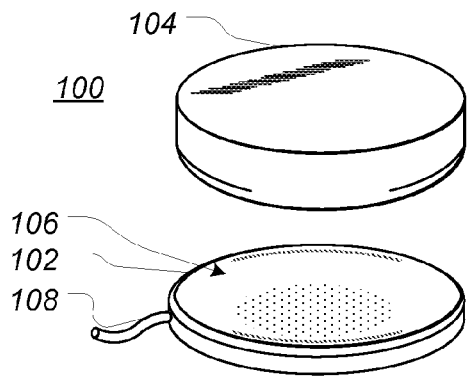
FIG. 1C depicts the example inductive power transfer system of FIG. 1A in a mated configuration.
Figure 1C:
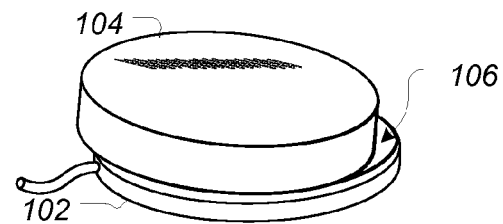
Figure 1C:
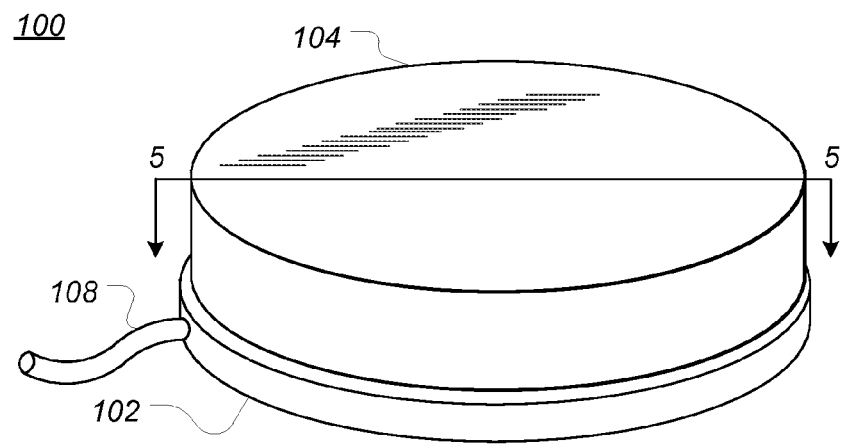

Embodiments described herein may relate to or take the form of systems and methods for improved efficiency of power transfer across an inductive power transfer interface. Other embodiments described herein relate to systems and methods for improved efficiency of power transfer when an inductive power transmitter experiences a low-load or no-load condition.

An inductive power transfer system may include an inductive power-transmitting component or device to transmit power and an inductive power-receiving component or device to receive power. In some examples, a battery-powered electronic device includes an inductive power-receiving component configured to charge one or more internal batteries. Example battery-powered electronic devices may include media players, media storage devices, personal digital assistants, tablet computers, cellular telephones, laptop computers, smart phones, styluses, global positioning sensor units, remote control devices, wearable devices, electric vehicles, home appliances, location tracking devices, medical devices, health devices, sports devices, accessory devices, and so on. Example inductive power transmitting devices may include docks, stands, clips, plugs, mats, attachments, and so on.

In many examples, a battery-powered electronic device ("accessory") may be positioned on a power-transmitting device ("dock"). In these systems, an electromagnetic coil within the dock ("transmit coil") may produce a time-varying electromagnetic flux ("transmitting power") to induce a current within an electromagnetic coil within accessory ("receive coil"). In other examples, a transmit coil may produce a static electromagnetic field and may physically move, shift, or otherwise change its position to produce a spatially-varying electromagnetic flux to induce a current within the receive coil.

The accessory may use the received current to replenish the charge of a rechargeable battery ("receiving power") or to provide power to operating components. In other words, when the accessory is positioned on the dock, the dock may transmit power via the transmit coil to the receive coil of the accessory.

In many cases, the dock may be configured to provide sustained power transmission to the accessory for a selected or otherwise limited time. For example, the dock may suspend sustained power transmission once the rechargeable battery of the accessory is replenished. In other examples, the dock may be configured to vary the amount of power transmitted to the accessory in response to changes in the power requirements of the accessory. For example, the dock may use information received or measured from the accessory to dynamically, intelligently, and rapidly adjust the power transmitted to the accessory.

In other embodiments, the dock may suspend sustained power transmission upon determining that the accessory has been removed from the dock. For example, the dock may include a processor that may be adapted to monitor a load condition of the transmit coil to determine when an accessory is removed. When the processor determines that the accessory is removed (i.e., "no-load condition"), the dock may suspend sustained power transmission and may enter a periodic ping mode during which the dock may intermittently transmit power. In other examples, when the processor determines that the accessory has substantially reduced its power requirements (i.e., "low-load condition"), the dock may suspend sustained power transmission and may enter the periodic ping mode. The processor may monitor the transmit coil during each ping for a load condition that may indicate that an accessory is present. After the processor determines that the accessory has returned, the dock may revert to the sustained power transmission mode.

In another embodiment, the dock and accessory may utilize a communication channel to mutually advertise various device modes, states, or requirements. For example, the accessory and dock may each include a wireless transceiver. The wireless transceiver may be any suitable communication technology such as, Wi-Fi, radio, Bluetooth, near field communication ("NFC"), optical, or infrared communication technology. In these embodiments, the dock may periodically ping for the accessory over the communication channel to determine whether the accessory is present and ready to receive transmitted power. For example, the dock may periodically request a response from an accessory over Wi-Fi. The accessory may respond via Wi-Fi that the accessory is ready to receive transmitted power. After the processor determines that the accessory has returned, the dock may revert to the sustained power transmission mode.

In other embodiments, the dock may monitor various sensors to determine whether an accessory is present and ready to receive transmitted power. For example, the dock may include an optical sensor such as an infrared proximity sensor. When the accessory is placed on the dock, the infrared proximity sensor may report to the aforementioned processor that the accessory is present. The processor may, optionally, use another method or structure to verify the presence of the accessory. Examples of different sensors that may be suitable include a mass sensor, a mechanical interlock, switch, button or the like, a Hall effect sensor, or other electronic sensor. Continuing the example, after the optical sensor reports that the accessory may be present, the processor may activate a wireless communication channel to attempt to communicate with the accessory. After the processor determines that the accessory has returned, the dock may revert to the sustained power transmission mode.

In other examples, magnetic field sensors may be used to assist the processor in determining whether an accessory is present. For example, in certain embodiments, a Hall sensor may be used. A Hall sensor may be configured to monitor for a magnetic field source within the accessory. For example, the accessory may include a permanent magnet to assist the accessory with aligning to the dock. A Hall sensor within the dock may detect the presence of the magnetic field and may report to the aforementioned processor that the accessory may be present.

Again, the processor may, optionally, use another means to verify the presence of the accessory as a method of double-checking the output from the Hall sensor. For example, after the Hall sensor reports that the accessory may be present, the processor may activate a wireless communication channel to attempt to communicate with the accessory. In another example, the processor may enter the aforementioned periodic ping mode. In further examples, the processor may verify the presence of the accessory by other suitable means. After the processor determines that the accessory has returned, the dock may revert to the sustained power transmission mode.

In other examples, multiple magnetic field sensors may be used to assist the processor in determining whether an accessory is present. For example, in certain embodiments, more than one Hall sensor may be used. For example, a first Hall sensor may be configured to monitor for a magnetic field source present within the accessory and may be adapted to detect the magnitude of magnetic or electromagnetic fields oriented along a first axis. A second Hall sensor may be adapted to detect fields oriented along a different axis. In these examples, the two Hall sensors may be configured to operate together to detect the presence of the magnetic field and may report to the aforementioned processor that the accessory is present. After the processor determines that the accessory has returned, the dock may revert to the sustained power transmission mode.

In many examples, a signal derived from the signals of multiple sensors may be of sufficient quality that signal amplification and/or filtering may be unnecessary. In these examples, the power required to operate more than one sensor may be less than the power required to operate a single sensor and a corresponding amplifier.

In other embodiments, the dock may include one or more physical switches to determine whether an accessory is present and ready to receive transmitted power. For example, the dock may include a normally open switch, button, latch or other mechanical or electrical element that is closed when an accessory is placed on the dock. The switch may be coupled to the aforementioned processor. After the processor determines that the accessory has closed the switch, the dock may verify that the accessory is present or, in the alternative, may immediately revert to the sustained power transmission mode.

FIG. 1A depicts a front perspective view of an example inductive power transfer system in an unmated configuration. The system 100 may include an inductive power receiver 104 and an inductive power transmitter 102. In the illustrated embodiment, the inductive power transmitter 102 may be connected to mains power (i.e., power outlet) by power cord 108. In other embodiments, the inductive power transmitter 102 may instead be battery operated. In still further examples, the inductive power transmitter 102 may be both battery operated and may include a power cord 108.

Furthermore, although the embodiment depicted in FIG. 1A is shown with the power cord 108 coupled to the housing of the inductive power transmitter 102, the power cord 108 may be connected to the inductive power transmitter 102 by any suitable means. For example, the power cord 108 may be removable and may include a connector that is sized to fit within an aperture or receptacle opened within the housing of the inductive power transmitter 102.

In various implementations and embodiments, either or both of the inductive power transmitter 102 and the inductive power receiver 104 may be included within or as a component of any kind or type of electronic device such as cell phones, smart phones, tablet computers, laptop computers, wearable devices, navigation devices, sports devices, health devices, medical devices, accessory devices, peripheral input devices, and so on. For example, the inductive power receiver 104 may be included within the housing of a cellular telephone. In such an example, the inductive power receiver may be entirely or partially concealed by the housing of the cellular telephone. In other examples, the inductive power receiver 104 may be included along a back surface of an electronic device. In still other embodiments, the inductive power receiver 104 may be included as an accessory for an electronic device. For example, the inductive power receiver 104 may be included within a protective case for a cellular telephone.

As shown, the inductive power receiver 104 may include a lower surface that may interface with, align or otherwise contact an interface surface 106 of the inductive power transmitter 102. In this manner, the inductive power receiver 104 and the inductive power transmitter 102 may be positionable with respect to each other. In certain embodiments, the interface surface 106 may be configured in a particular shape that mates with a complementary shape of the inductive power receiver 104. For example, as illustrated, the interface surface 106 has a concave shape following a select curve. A bottom surface of the inductive power receiver 104 has as a convex shape following the same or substantially similar select curve as the interface surface 106.

The geometry of the bottom surface of the inductive power transmitter 104 may encourage alignment within complimentary geometry of the interface surface 106. In the example of a circular convex and circular concave shape of the interface surface 106 and the bottom surface of the inductive power receiver 104, the complementary shapes may discourage imperfect or partial alignment, as shown for example in FIG. 1B. In such an embodiment, the inductive power receiver 104 may slide down the concave interface surface 106 to align with the inductive power transmitter 102, as shown, for example, by FIG. 1C.

In other embodiments, the interface surface 106 has another shape, for example a convex shape or a planar shape. In other examples, the interface surface has multiple faces or facets that encourage alignment of the inductive power receiver 104 with the inductive power transmitter 102. In many embodiments, the interface surface 106 is axially symmetric while in others, the surface may be axially asymmetric.

Although shown with the inductive power receiver 104 as sized with a lateral cross-section less than that of the inductive power transmitter 102, such a relationship is not required. For example, in certain embodiments, the inductive power receiver 104 has a horizontal cross-section larger than the inductive power transmitter 102.

Figure 2:
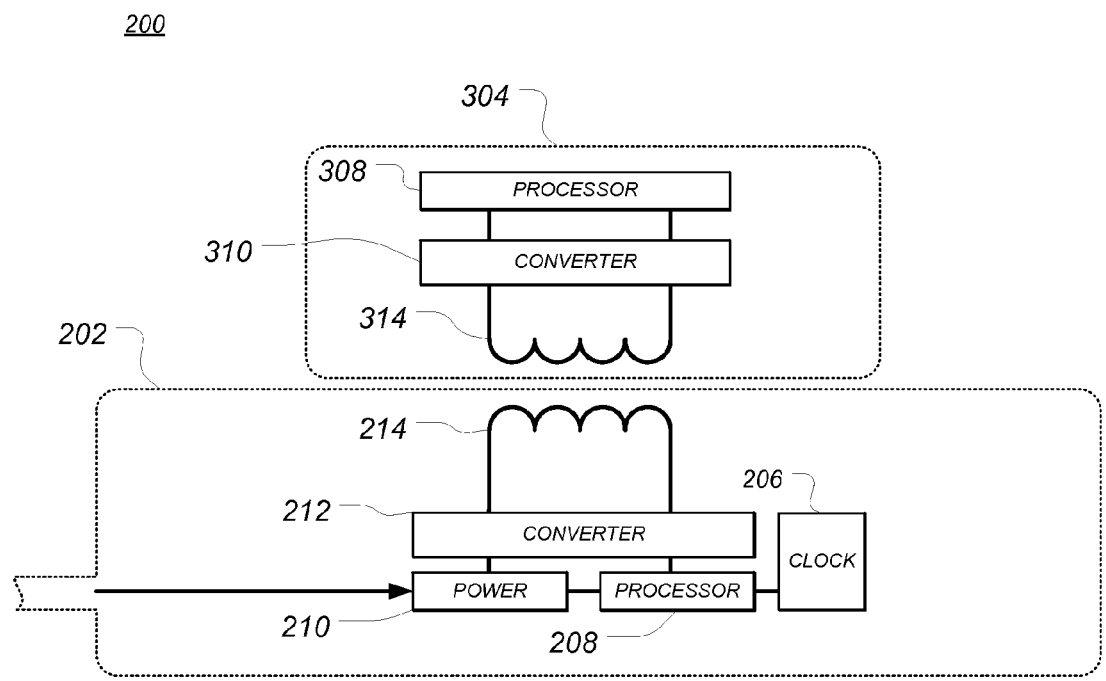
FIG. 2 depicts a simplified signal flow block diagram of a sample inductive power transfer system.

FIG. 2 depicts a simplified signal flow block diagram of a sample inductive power transfer system. The inductive power transfer system 200 may include an inductive power transmitter 202 and an inductive power receiver 304 separated by an air gap. The inductive power receiver 304 is depicted positioned on a top surface of the inductive power transmitter 202, although such a configuration is not required.

The inductive power transmitter 202 may include a clock 206 connected to a processor 208 and a direct current converter 212. The clock 206 can generate one or more timing signals for the inductive power transfer system 200. The processor 208 may be coupled to a power supply 210 such as a direct current power supply. In certain embodiments, the processor 208 may control the state of the direct current converter 212, which has power input from the power supply 210. In one embodiment, the clock 206 generates periodic signals that are used by the processor 208 to activate and deactivate switches in the direct current converter 212. The switches may convert the direct current from the power supply 210 to alternating current suitable for exciting a transmit coil 214.

The transmitter 202 of the inductive power transfer system 200 may be configured to provide a time-varying signal to the transmit coil 214 in order to induce a voltage within the receive coil 314 in the receiver through inductive coupling with the transmit coil 214. In this manner, power may be transferred from the transmit coil 214 to the receive coil 314. The signal produced in the receive coil 314 may be received by a direct current converter 310 that converts the signal into a direct current signal. Any suitable direct current converter 310 can be used in the inductive power transfer system 200. For example, in one embodiment, a rectifier may be used as a direct current converter. A programmable load such as a processor 308 may then receive the direct current signal.

Figure 3A:
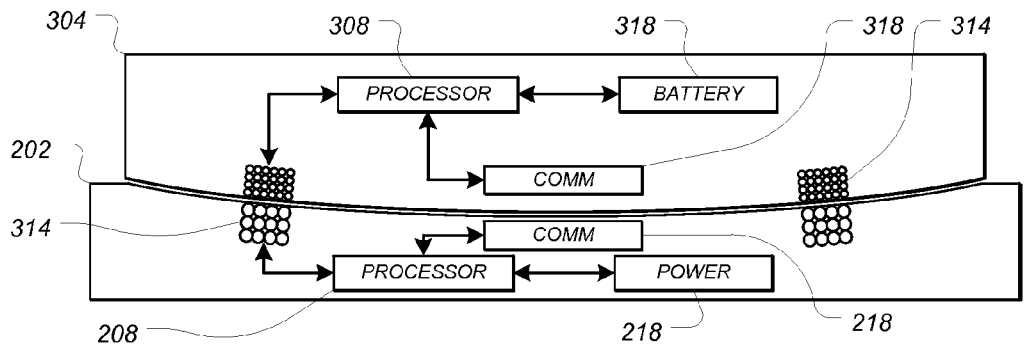
FIG. 3A depicts a side cross-section view of an example inductive power transfer system taken along line 4-4 of FIG. 1C.

FIG. 3A depicts a side cross-section view of an example inductive power transfer system taken along line 4-4 of FIG. 1C, showing a simplified block diagram within a housing of an example inductive power-receiving device and a simplified block diagram within a housing of an example inductive power-transmitting device. As illustrated, the inductive power receiver 304 may include one or more receive coils 314. In some embodiments, the receive coil 314 may have a tilted or semi-conical shape, or a curved surface, to follow a curvature of the housing of the inductive power receiver 304. In other embodiments, the receive coil 314 has a substantially planar shape.

The inductive power receiver 304 may also include processor 308. The processor 308 may be coupled to or more transitory or non-transitory storage media, and a battery 318. The battery 318 may include, but may not necessarily be limited to, a battery power source, a capacitive power source, or a combination thereof. The processor 308 may execute one or more instructions, sequentially or otherwise, that are stored in the storage medium in order to perform one or more device operations of the inductive power receiver 304. The processor 308 may also be coupled to one or more sensors. For example, a temperature sensor and may be operably connected to the battery 318 or the processor 308 such that, if a select temperature threshold is reached, the processor 308 may selectively disable one or more components or processes.

Similarly, the inductive power transmitter 202 may also include processor 208, one or more transitory or non-transitory storage media, a power source 218, and a transmit coil 214. As with the receive coil 314, in many embodiments, the transmit coil 214 may have a tilted or semi-conical shape to follow a curvature of the housing of the inductive power transmitter 202.

In addition, the inductive power receiver 304 and the inductive power transmitter 202 may each include a wireless communication interface 318 and 218 respectively. The communication interface 318 and 218 can provide electronic communications between the inductive power receiver 304 and the inductive power transmitter 202 or any other external communication network, device or platform, such as but not limited to wireless interfaces, Bluetooth interfaces, USB interfaces, Wi-Fi interfaces, TCP/IP interfaces, near field communication ("NFC"), optical interfaces, infrared interfaces, network communications interfaces, or any conventional communication interfaces. The wireless communication interfaces 318 and 218 may be adapted for communication between the processors 208 and 308 to mutually advertise various modes, states, or requirements of the inductive power receiver 304 or the inductive power transmitter 202. For example, the inductive power transmitter 202 may periodically ping for the inductive power receiver 304 over a communication channel established by the wireless communication interfaces 318 and 218 to determine whether the inductive power receiver 304 is present and ready to receive transmitted power.

More particularly, the inductive power transmitter 202 may periodically request ("ping") a response from the inductive power receiver 304 over Wi-Fi. The processor 308 may receive a signal from the communication interface 318 and may respond that the inductive power receiver 304 is ready to receive transmitted power. The processor 208 may receive the response via the communication channel and may begin, continue, or revert to a sustained power transmission mode by exciting the transmit coil 214.

Figure 3B:
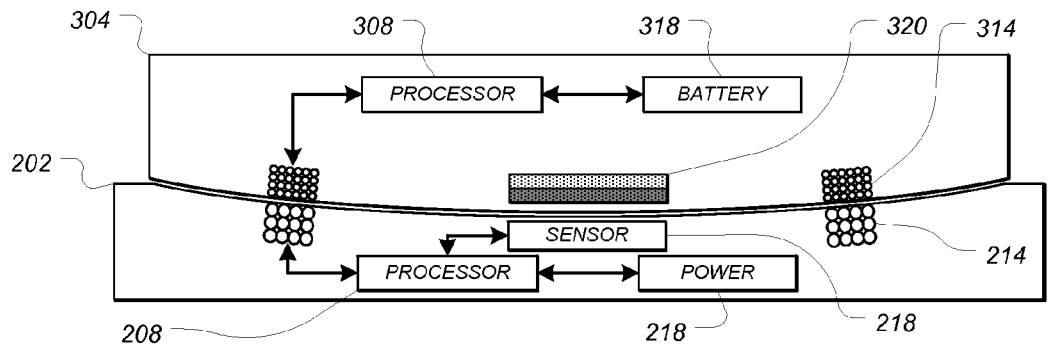
FIG. 3B depicts a side cross-section view of an example inductive power transfer system taken along line 4-4 of FIG. 1C.

FIG. 3B depicts a side cross-section view of an example inductive power transfer system taken along line 4-4 of FIG. 1C. As with the embodiment depicted in FIG. 3A, the example inductive power transfer system includes an inductive power transmitter 202 and an inductive power receiver 304. The inductive power receiver 304 may include a processor 308, a battery 316, and a receive coil 314. In addition, the inductive power receiver 304 may include one or more magnetic field source 320, such as a permanent magnet. The magnetic field source 320 may be oriented to produce a magnetic field along any axis. The inductive power transmitter 202 may include a processor 208, a power source 216, and a transmit coil 214. The inductive power transmitter 202 may include a Hall sensor 218 coupled to the processor 208.

The Hall sensor 218 may report information about nearby magnetic fields to the processor 208. The processor 208 can use the magnetic field data to determine whether the detected magnetic fields originate at the magnetic field source 320, or from another magnetic field source. For example, the processor 208 may monitor for a magnetic field of particular amplitude, or within a particular range. For example, if the processor 208 determines that a detected magnetic field has an amplitude greater than a selected minimum and smaller than a selected maximum, the processor 208 may presume that the magnetic field source 320, and thus the inductive power receiver 304, is present and ready to receive power. In another example, the processor 208 may determine that a detected magnetic field has an amplitude less than a selected minimum, or greater than a selected maximum. In this example, the processor 208 may presume that the detected magnetic field is not associated with the inductive power receiver 304. In a further example, if the processor 208 determines that a detected magnetic field is oriented along a particular axis, the processor 208 may presume that the inductive power receiver 304 is present.

After the processor 208 determines that the inductive power receiver 304 is present, the processor 208 can activate a wireless communication channel (not shown) to attempt to communicate with the inductive power receiver 304 to verify or confirm that the inductive power receiver 304 is ready to receive inductive power. After verification, the inductive power transmitter 202 may begin transmitting inductive power.

In another example, the inductive power receiver 304 may apply a signal to the receive coil 314 that can be detected by the Hall sensor 218. For example, the signal may be a direct current signal that excites a static electromagnetic field in the receive coil 314. The static electromagnetic field may be detected by the Hall sensor 218 and reported to the processor 218. In another example, the signal may be a direct current signal that changes amplitude over time. The Hall sensor 218 may detect the amplitude of the electromagnetic field as it changes in the receive coil 314 as a result of the signal. The processor 218 may analyze the variation in the amplitude of the detected magnetic field to determine whether the inductive power receiver 304 is present. In some examples, the signal may include digital information encoded in the changing amplitude. The processor 218 may decode and use the information for a variety of tasks. For example, the signal may include one or more authentication tokens that the processor 218 may use to determine whether the inductive power receiver 304 is permitted or authorized to receive inductive power from the inductive power transmitter 202. In another example, the signal may include information relating to the state of the inductive power transmitter 202 such as information relating to temperature, battery level, usage statistic, current load requirements, user information, or any other information.

In other examples, the Hall sensor 218 may not be required for detecting the presence or absence of the inductive power receiver 304. For example, the processor 218 may monitor the transmit coil 214 for a current peak that may be the result of movement of the magnetic field source 320. One may appreciate that motion of a permanent magnet may produce a time or spatially-varying electromagnetic flux that may induce an electrical current within a nearby electromagnetic coil.

Continuing the example, the processor 218 may monitor for a sudden peak in the within the transmit coil 214. If a peak is not detected, the processor 218 may continue monitoring the transmit coil for current. On the other hand, if a peak is detected, the processor 218 may attempt to verify that an induced current sensed in the transmit coil is actually the result of the placement of an inductive power receiver 304 on the inductive power transmitter 202.

Figure 3C:
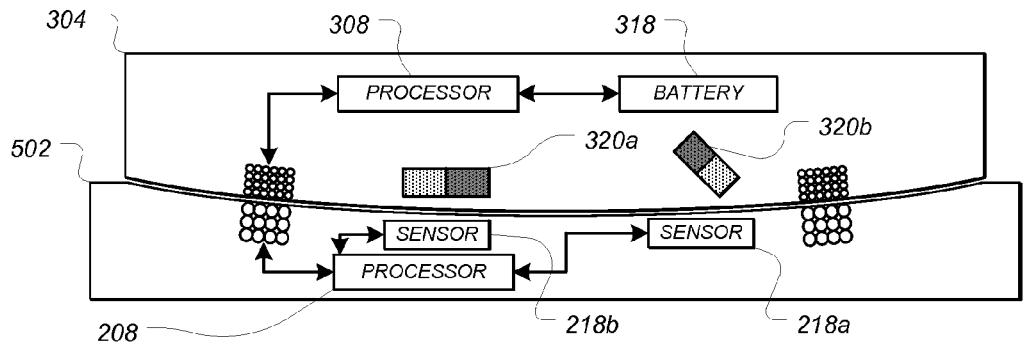
FIG. 3C depicts a side cross-section view of an example inductive power transfer system taken along line 4-4 of FIG. 1C.

In other examples, multiple magnetic field sensors may be used to assist the processor 208 in determining whether an accessory is present. FIG. 3C depicts a side cross-section view of an example inductive power transfer system taken along line 4-4 of FIG. 1C. As with the embodiment depicted by FIG. 3B, the inductive power transfer system includes an inductive power transmitter 202 and an inductive power receiver 304.

The inductive power receiver 304 includes a processor 308, a battery 316, and a receive coil 314. In addition, the inductive power receiver 304 may include one or more magnetic field sources 320*a*, 320*b*. The magnetic field sources 320*a*, 320*b* may be oriented along the same axis or, for example as illustrate, may be oriented along a different axis. The inductive power transmitter 202 may include a processor 208, a power source 216, and a transmit coil 214. The inductive power transmitter 202 may include multiple Hall sensors 218*a*, 218*b* each coupled to the processor 208. In many examples, a first Hall sensor 218*a* may be adapted to detect the magnitude of magnetic or electromagnetic fields oriented along a first axis. A second Hall sensor 218*b* may be adapted to detect fields oriented along a different axis.

In these examples, the two Hall sensors 218*a*, 218*b* may be configured to operate together to detect the presence of the magnetic field of the magnetic field source 320 and may report that information to the processor 208. After the processor 208 determines that the inductive power receiver 304 has returned, the inductive power transmitter 202 may revert to or enter the sustained power transmission mode.

Figure 3D:
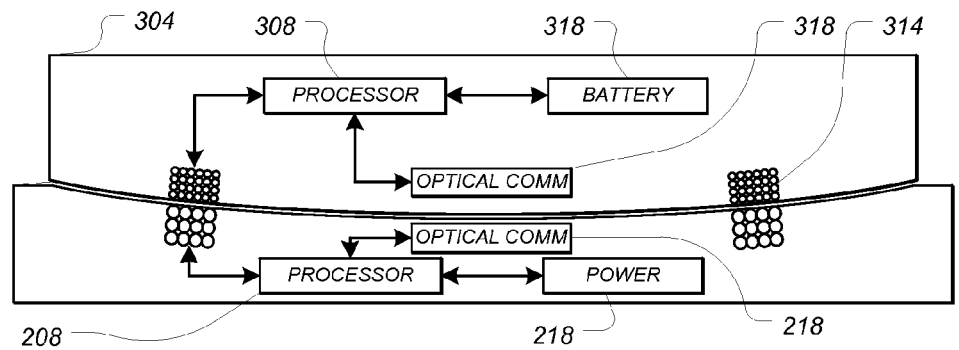
FIG. 3D depicts a side cross-section view of an example inductive power transfer system taken along line 4-4 of FIG. 1C.

FIG. 3D depicts a side cross-section view of an example inductive power transfer system taken along line 4-4 of FIG. 1C. In the illustrated embodiment, the processors 208, 308 may also be coupled to respective optical communication interfaces 218, 318 respectively. The optical communication interfaces 218, 318 may be any number of suitable optical communication interfaces. For example, in one embodiment, one or both of the optical communication interfaces may include a one or more light emitting diodes and one or more phototransistors. In this example, a light emitting diode within the optical communication interface 218 may convey a signal to a phototransistor within the optical communication interface 318. The signal may include a request for confirmation that the inductive power receiver 304 is ready to receive power. Thereafter, the processor 308 may instruct a light emitting diode within the optical communication interface 318 to convey a signal back to the optical communication interface 218 that the inductive power receiver 304 is ready to receive power. In other examples, optical communication between the optical communication interfaces 218 and 318 may be one-way. For example, the optical communication interfaces 218 and 318 may mutually advertise various electronic device states of the inductive power transmitter 202 and the inductive power receiver 304.

In other embodiments, either of the optical communication interfaces 218, 318 may be a passive optical element such a lens or reflector configured to reflect light of a particular wavelength or in a particular pattern. In one example, the optical communication interface 318 may be passive. The optical communication interface 218 may illuminate a light emitting diode that may produce light that can reflect from the passive optical communication interface 318. In some examples, the optical communication interface 218 may pass light from a light emitting diode positioned elsewhere, for example with a light guide or light pipe.

A passive optical communication interface may include a bar code readable by optical communication interface 218. The optical communication interface 218 may communicate to the processor 208 the read image. Thereafter, the processor 208 determines that the passive optical communication interface, and thus the inductive power receiver 304, is present and ready to receive inductive power.

Figure 3E:
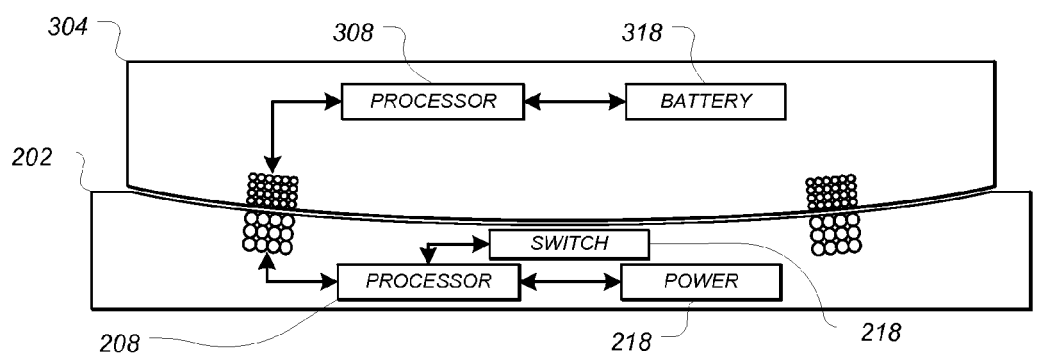
FIG. 3E depicts a side cross-section view of an example inductive power transfer system taken along line 4-4 of FIG. 1C.

FIG. 3E depicts a side cross-section view of an example inductive power transfer system taken along line 4-4 of FIG. 1C. As with the embodiment depicted by FIG. 3A, the example inductive power transfer system may include an inductive power transmitter 202 which may include a processor 208 coupled to a power source 216 and a transmit coil 214. The inductive power transfer system may also include an inductive power receiver 304 which may include a processor 308 coupled to a battery 316 and a receive coil 314. In this embodiment, the inductive power transmitter may include one or more switches 218. The switch 218 may be a normally open switch such that when the inductive power receiver 304 is placed on the inductive power transmitter 202, the switch is closed. In these embodiments the switch 218 may be coupled to the processor 208 such that when the switch 218 is closed, the processor 208 may determine that the inductive power receiver is ready to receive power. After the processor 208 determines that the inductive power receiver 304 has returned, the inductive power transmitter 202 may revert to or enter the sustained power transmission mode.

Figure 3F:
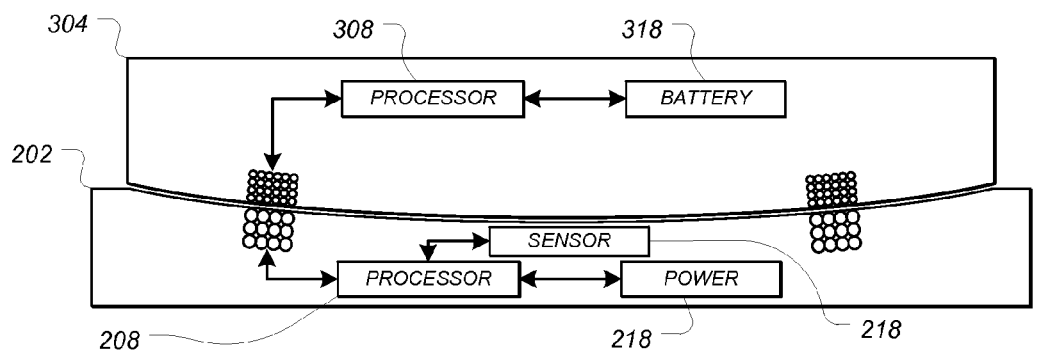
FIG. 3F depicts a side cross-section view of an example inductive power transfer system taken along line 4-4 of FIG. 1C.

FIG. 3F depicts a side cross-section view of an example inductive power transfer system taken along line 4-4 of FIG. 1C. As with the embodiment depicted by FIG. 3A, the example inductive power transfer system may include an inductive power transmitter 202 which may include a processor 208 coupled to a power source 216 and a transmit coil 214. The inductive power transfer system may also include an inductive power receiver 304 which may include a processor 308 coupled to a battery 316 and a receive coil 314. In the illustrated embodiment, the processor 208 may be coupled to a sensor 218. The sensor 218 may be adapted to detect for the presence of the inductive power receiver 304.

In certain examples, the sensor 218 may be configured to detect mechanical agitation of the inductive power transmitter 202 associated with physically placing the inductive power receiver 304 on the interface surface of the inductive power transmitter 202. In such an example, the sensor 218 may be an accelerometer, gyroscope, piezoelectric, piezoresistive, strain, tension, pressure, or any other force-sensitive sensor.

After the sensor 218 reports that the inductive power receiver 304 is present, the processor 208 may activate a wireless communication channel (not shown) to attempt to communicate with the inductive power receiver 304. In another example, the processor 208 may enter the periodic ping mode. In further examples, the processor 208 may verify the presence of the inductive power receiver 304 by other suitable means. After the processor 208 determines that the inductive power receiver 304 has returned, the inductive power transmitter 202 may revert to the sustained power transmission mode.

Figure 4:
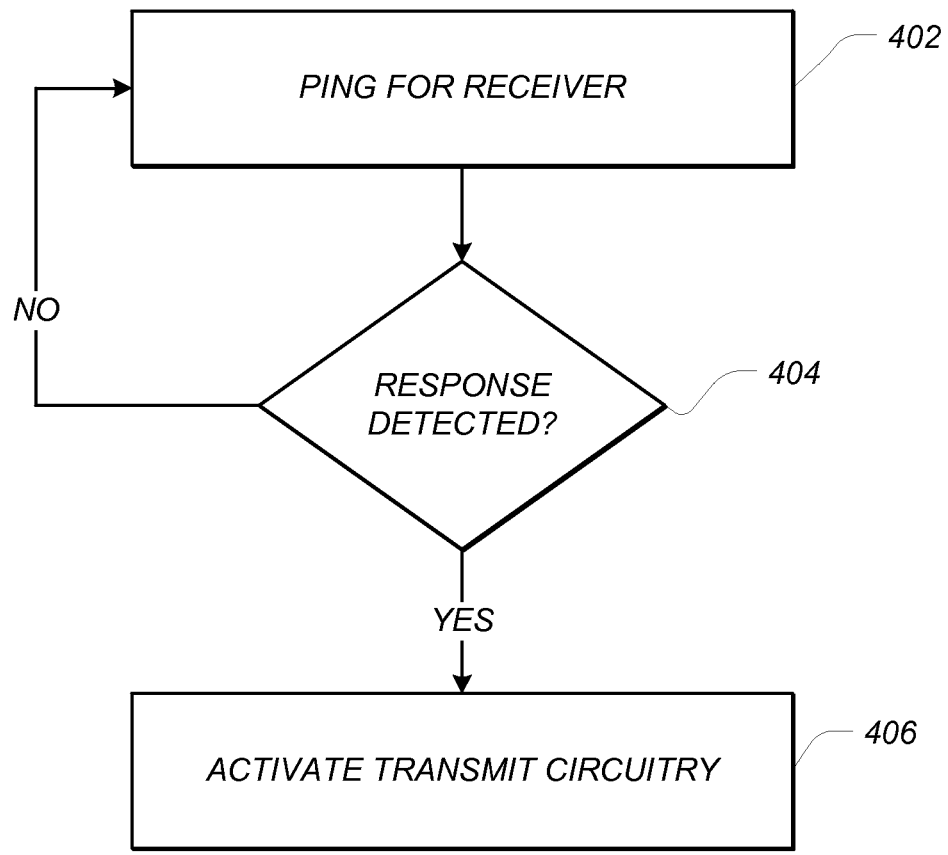
FIG. 4 depicts a flow chart illustrating example steps of a method of selectively activating transmit circuitry associated with an inductive power transmitter adapted to periodically ping for an inductive power receiver.

FIG. 4 depicts a flow chart illustrating example steps of a method of selectively activating transmit circuitry associated with an inductive power transmitter adapted to periodically ping for an inductive power receiver. The method may begin at step 402 in which an inductive power transmitter may ping for a receiver. For example, both the transmitter and receiver may include a wireless communication channel to mutually advertise various device modes, states, or requirements, such as power requirements. In one example, the receiver and transmitter may each include a wireless transceiver. The wireless transceiver may any suitable communication technology such as, Wi-Fi, radio, Bluetooth, near field communication ("NFC"), optical, or infrared. In these embodiments, the transmitter may periodically send a signal interrogating for the presence of the receiver over the communication channel. For example, the transmitter may periodically request a response from the receiver over Wi-Fi. The receiver may respond via Wi-Fi that the receiver is ready to receive transmitted power. The transmitter may receive the response at step 404 or, in the alternative, if the transmitter does not receive a response, the transmitter may revert to step 402. After the transmitter receives the response from the receiver, the transmitter may active inductive power transmission circuitry at 406.

Figure 5:
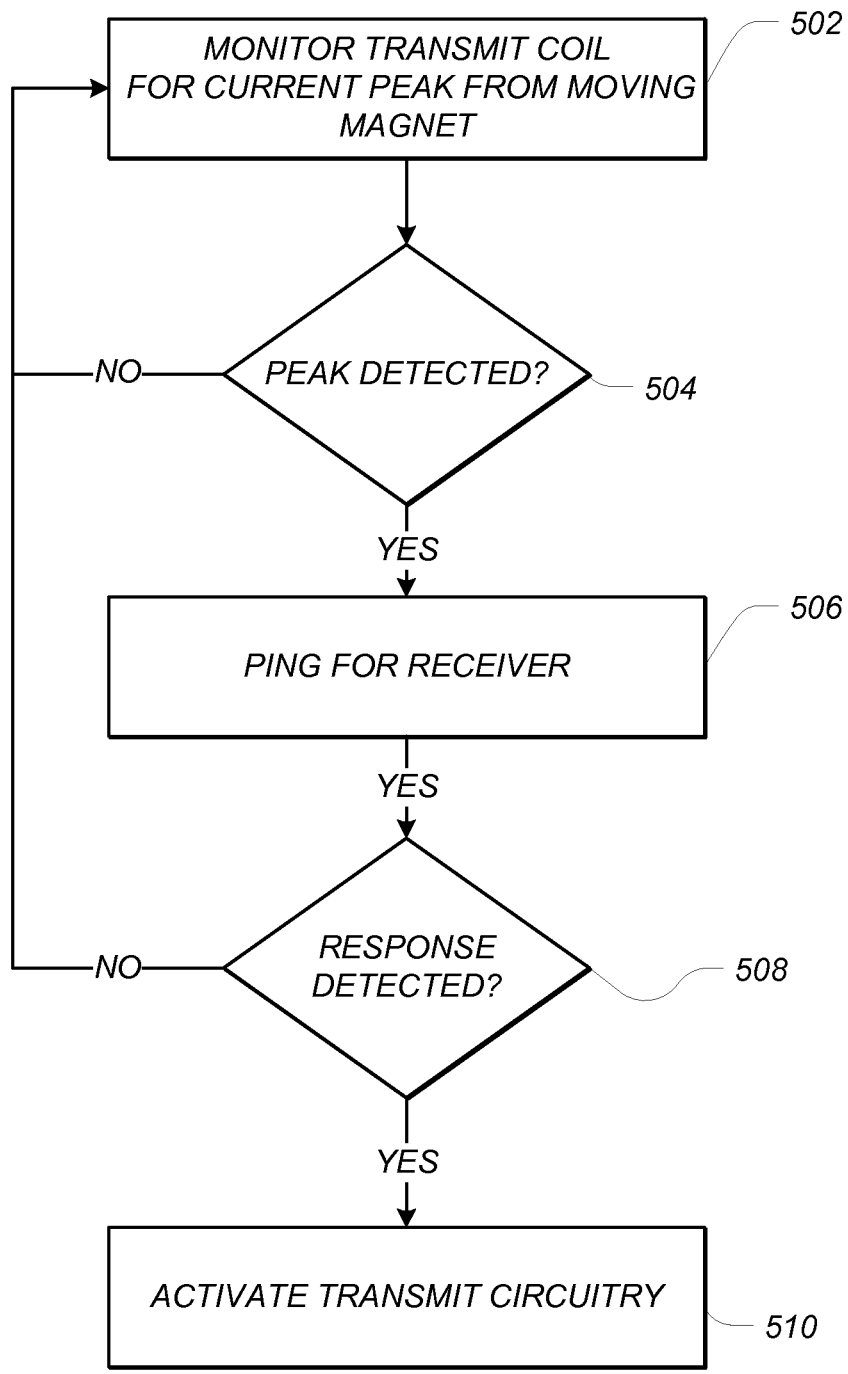
FIG. 5 depicts a flow chart illustrating example steps of a method of selectively activating transmit circuitry associated with an inductive power transmitter adapted to monitor a transmit coil for a current induced by motion of an alignment magnet associated with an inductive power receiver.

FIG. 5 depicts a flow chart illustrating example steps of a method of selectively activating transmit circuitry associated with an inductive power transmitter adapted to monitor a transmit coil for a current induced by motion of an alignment magnet associated with an inductive power receiver. The method may begin at 502 in which a processor associated with an inductive power transmitter may monitor a transmit coil for a current peak resulting from the movement of a magnetic field source such as a magnet.

In many examples, motion of a permanent magnet nearby a coil may produce a time or spatially-varying electromagnetic flux that may induce an electrical current within the transmit coil. Accordingly, the processor may monitor for a sudden peak in the current at 504. If a peak is not detected, the processor may continue monitoring the transmit coil for current. On the other hand, if a peak is detected, the method may continue at 506, in which the processor may initiate a verification process. The verification process may attempt to verify that an induced current sensed in the transmit coil is actually the result of the placement of an inductive power receiver on the inductive power transmitter.

The verification process may begin at step 506 in which the inductive power transmitter may ping for a receiver over, for example, a wireless communication channel as described with respect to the method illustrated by FIG. 4. The verification process may wait at 508 for a response from the receiver. In another example, the transmitter may activate the transmit coil to send a small amount of power for a selected period of time. In these embodiments, the processor may monitor for a load experienced by the transmit coil. A load to the transmit coil may verify that an inductive power receiver is receiving power. If a load is not detected, the method may stop the verification process and return to 502. If, alternatively, a load is detected, transmit circuitry may be activated at 510.

Figure 6:
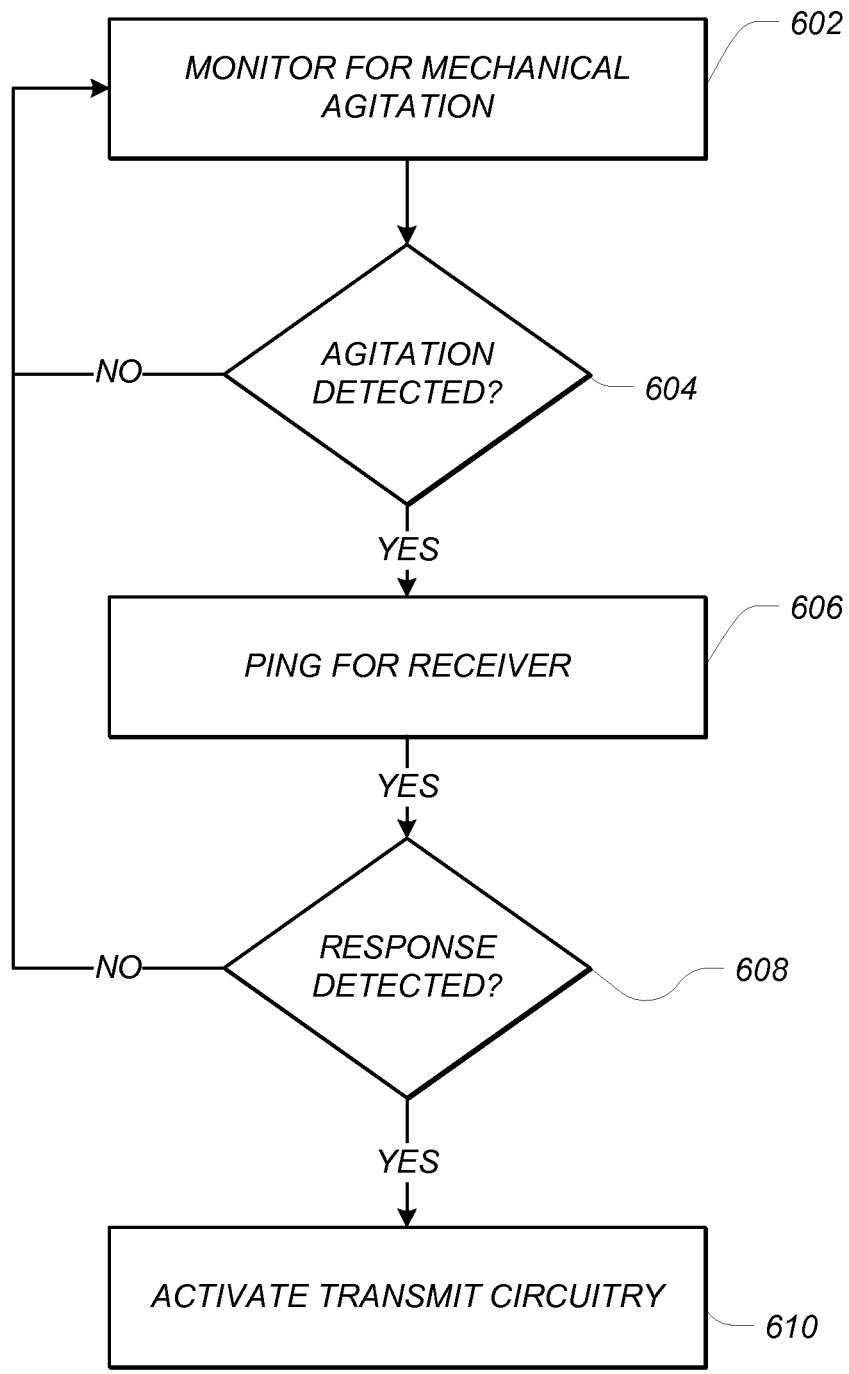
FIG. 6 depicts a flow chart illustrating example steps of a method of selectively activating transmit circuitry associated with an inductive power transmitter adapted to monitor for mechanical agitation associated with placing an inductive power receiver on the inductive power transmitter.

FIG. 6 depicts a flow chart illustrating example steps of a method of selectively activating transmit circuitry associated with an inductive power transmitter adapted to monitor for mechanical agitation associated with placing an inductive power receiver on the inductive power transmitter. The method may begin at 602 in which a processor associated with an inductive power transmitter may monitor a sensor for agitation resulting from placing a receiver on a transmitter. In many examples, the receiver may cause a measurable agitation when it is placed on a transmitter.

Accordingly, the processor may monitor for an agitation at 604. If an agitation is not detected, the processor may continue monitoring. Alternatively, if an agitation is detected, the method may continue at 606, in which the processor may initiate a verification process. The verification process may attempt to verify that the sensed agitation is actually the result of the placement of an inductive power receiver on the inductive power transmitter. The verification process may begin at step 606 in which the inductive power transmitter may ping for a receiver over, for example, a wireless communication channel as described with respect to the method illustrated by FIG. 4 or by periodically transmitting power and monitoring for a load to a transmit coil as described with respect to the method illustrated by FIG. 5. If, alternatively, the presence of the receiver is verified, transmit circuitry may be activated at 610.

Figure 7:
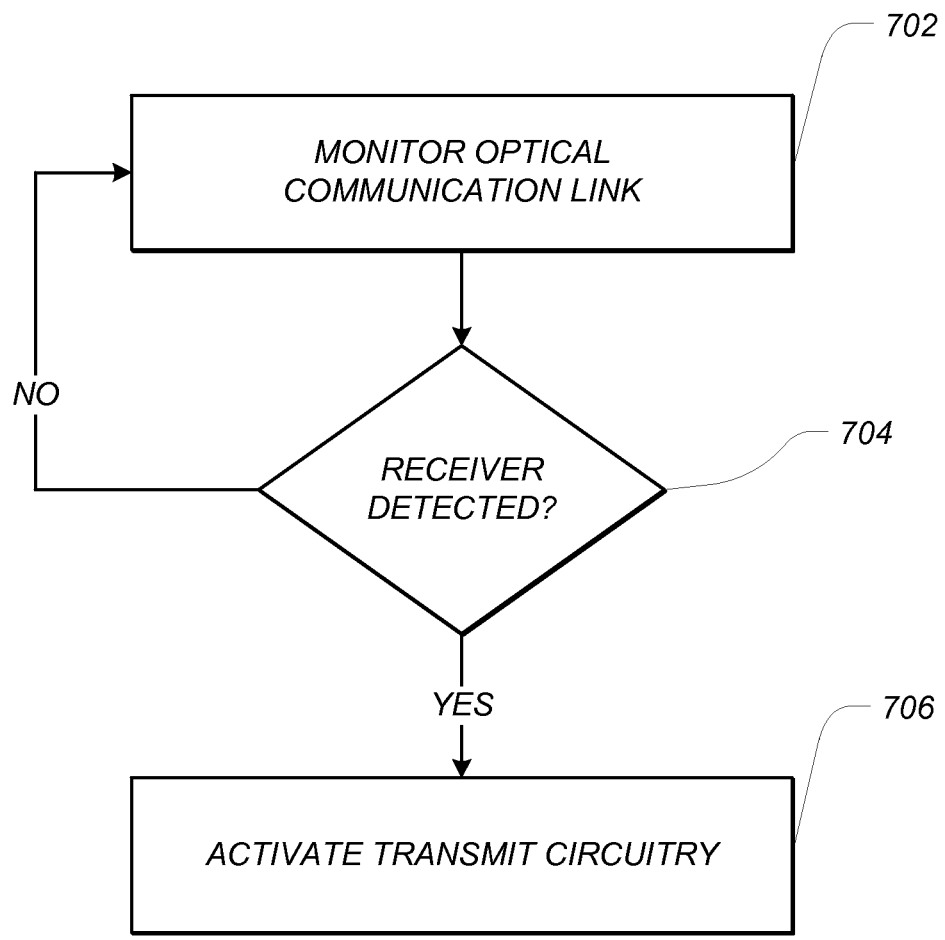
FIG. 7 depicts a flow chart illustrating example steps of a method of selectively activating transmit circuitry associated with an inductive power transmitter adapted to monitor an optical communication link for a response from an inductive power receiver.

FIG. 7 depicts a flow chart illustrating example steps of a method of selectively activating transmit circuitry associated with an inductive power transmitter adapted to monitor an optical communication link for a response from an inductive power receiver. The method may begin at step 702 in which an inductive power transmitter may ping for a receiver over an optical communication link. For example, both the transmitter and receiver may include a light transmitter and a light sensor. In other examples, the transmitter may include a camera (e.g., charge-coupled device, complementary metal-oxide semiconductor devices) that may be configured to read an image, number, code, or pattern disposed on a surface of the receiver. In still further examples, the transmitter may include an infrared or optical light proximity sensor.

In these embodiments, the transmitter may periodically request a response from the receiver over the optical communication link. The receiver may respond via the optical communication link that the receiver is ready to receive transmitted power. Alternately, the transmitter may detect that the receiver is present based upon feedback from the optical sensor included there. The transmitter may receive the response at step 704 or, in the alternative, if the transmitter determines that the receiver is not present, the transmitter may revert to step 702. After the transmitter determines that the receiver is present, the transmitter may active inductive power transmission circuitry at 706.

Figure 8:
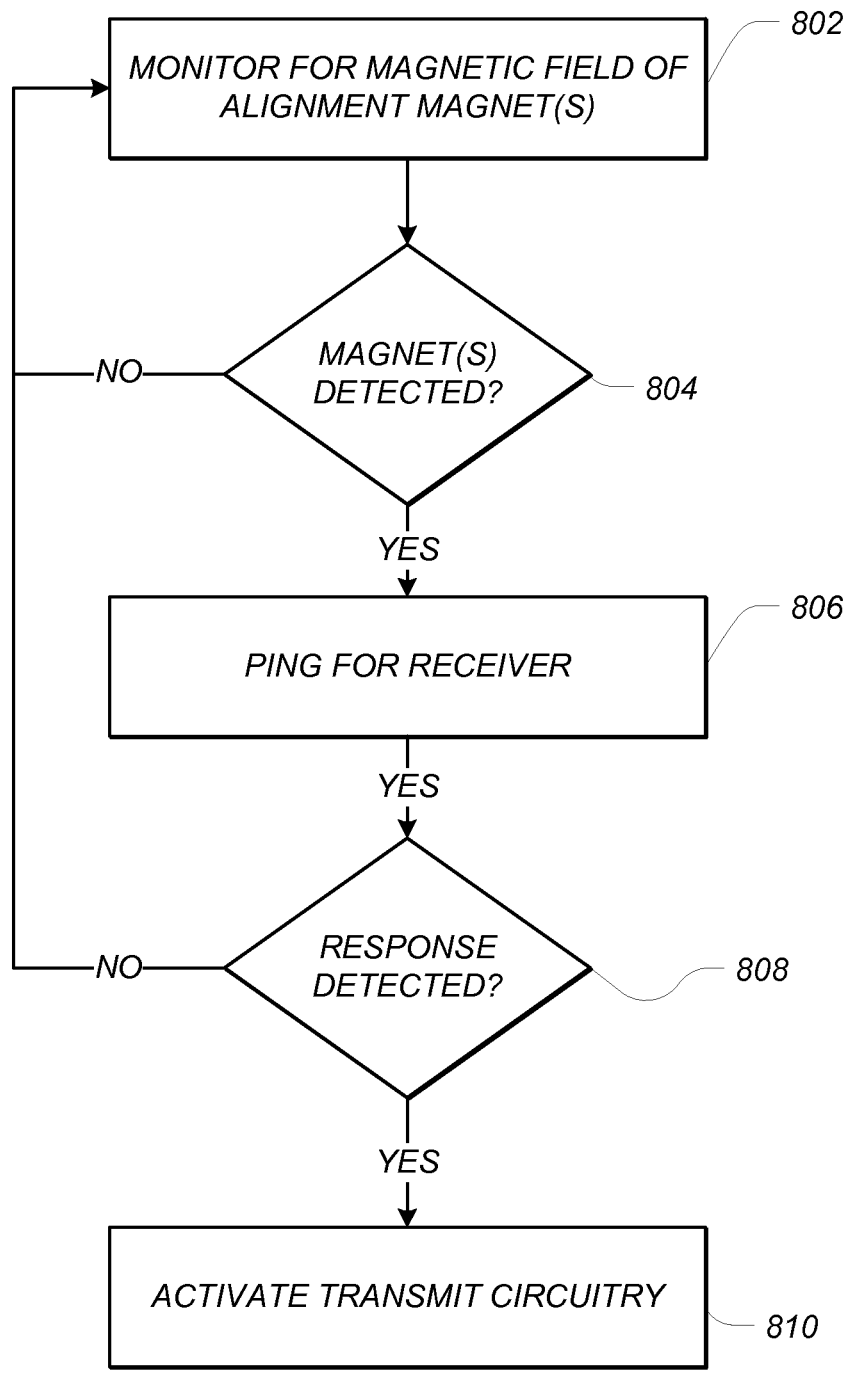
FIG. 8 depicts a flow chart illustrating example steps of a method of selectively activating transmit circuitry associated with an inductive power transmitter adapted to monitor a magnetic field sensor for the presence of an alignment magnet associated with an inductive power receiver.

FIG. 8 depicts a flow chart illustrating example steps of a method of selectively activating transmit circuitry associated with an inductive power transmitter adapted to monitor a magnetic field sensor for the presence of an alignment magnet associated with an inductive power receiver. The method may begin at 802 in which a processor associated with an inductive power transmitter may monitor one or more magnetic field sensors (e.g., Hall sensors, reed sensors, micro-electromechanical devices, magnetic field/magnetic anomaly sensors, giant magnetoresistance sensors, and the like) resulting from the movement of a magnetic field source such as a magnet.

In many examples, motion of a permanent magnet nearby a coil may produce a time or spatially-varying electromagnetic flux that may be measurable by a magnetic field sensor. In other examples, a magnetic field sensor may be adapted to measure a static magnetic field. Accordingly, the processor may monitor for a magnetic field at 804. If a magnetic field is not detected, the processor may continue monitoring. Alternately, if a magnetic field is detected, the method may continue at 806, in which the processor may initiate a verification process. The verification process may attempt to verify that magnetic field sensed is actually the result of the placement of an inductive power receiver on the inductive power transmitter.

The verification process may attempt to verify that an induced current sensed in the transmit coil is actually the result of the placement of an inductive power receiver on the inductive power transmitter. The verification process may begin at step 806 in which the inductive power transmitter may ping for a receiver over, for example, a wireless communication channel as described with respect to the method illustrated by FIG. 4 or by periodically transmitting power and monitoring for a load to a transmit coil as described with respect to the method illustrated by FIG. 5. If, alternatively, the presence of the receiver is verified, transmit circuitry may be activated at 810.

In many examples more than one magnetic field sensor may be used. The magnetic field sensors may be oriented in different directions to increase sensitivity. In still further examples, the magnetic field sensors may be calibrated to prefer a particular magnetic field strength. For example, the magnetic field sensors may report to the processor that the receiver is present only if the detected magnetic field is within a particular strength range. In other embodiments, the magnetic field sensors may report to the processor that the receiver is present only if the detected magnetic field is above a particular threshold. In other embodiments, the magnetic field sensors may be configured to read a particular magnetic signature of a receiver. For example, the receiver may contain multiple permanent magnets that each have different field strength. The magnetic field sensors may be adapted to recognize the combination of permanent magnets as an authentication that the receiver is present and ready to receive power.

In still further embodiments, alternating magnetic field sensors may be used. In these examples, a receiver may transmit an alternating magnetic field to a transmitter containing an alternating magnetic field sensor configured to detect the receiver's transmission.

Figure 9:
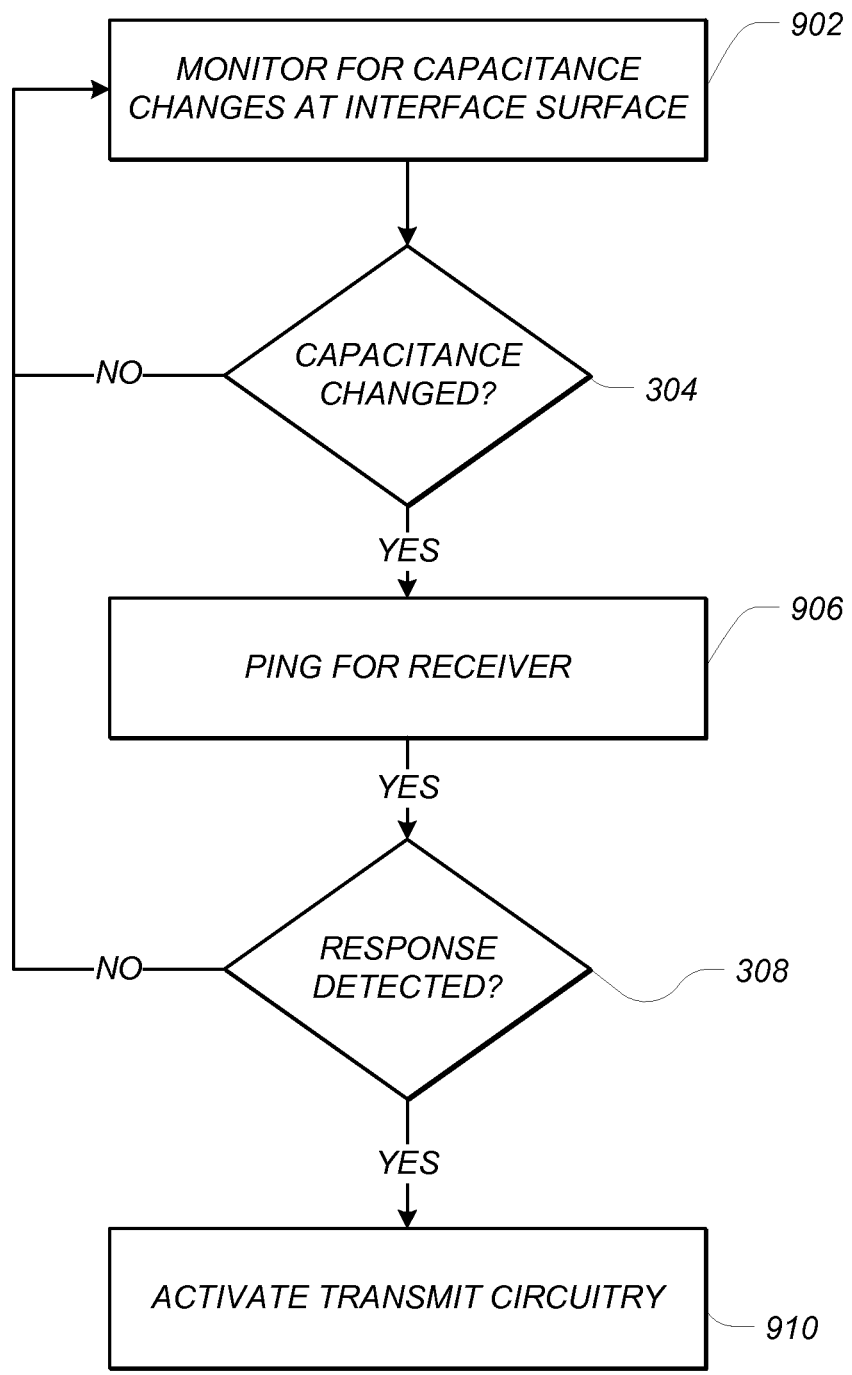
FIG. 9 depicts a flow chart illustrating example steps of a method of selectively activating transmit circuitry associated with an inductive power transmitter adapted to monitor for capacitive changes associated with placing an inductive power receiver on the inductive power transmitter.

FIG. 9 depicts a flow chart illustrating example steps of a method of selectively activating transmit circuitry associated with an inductive power transmitter adapted to monitor for capacitive changes associated with placing an inductive power receiver on the inductive power transmitter. The method may begin at 902 in which a processor associated with an inductive power transmitter may monitor for capacitance changes corresponding to the placement of a receiver on the transmitter. For example, the transmitter may include one or more capacitive plates that may detectably change capacitance in the presence of a receiver. Accordingly, the processor may monitor for a capacitive change at 904. If a receiver is not detected, the processor may continue monitoring. Alternately, if a receiver detected, the method may continue at 906, in which the processor may initiate a verification process. The verification process may attempt to verify that capacitance change sensed is actually the result of the placement of an inductive power receiver on the inductive power transmitter.

The verification process may attempt to verify that the capacitance change sensed in the transmit coil is actually the result of the placement of an inductive power receiver on the inductive power transmitter. The verification process may begin at step 906 in which the inductive power transmitter may ping for a receiver over, for example, a wireless communication channel as described with respect to the method illustrated by FIG. 4 or by periodically transmitting power and monitoring for a load to a transmit coil as described with respect to the method illustrated by FIG. 5. If, alternatively, the presence of the receiver is verified, transmit circuitry may be activated at 910.

Figure 10:
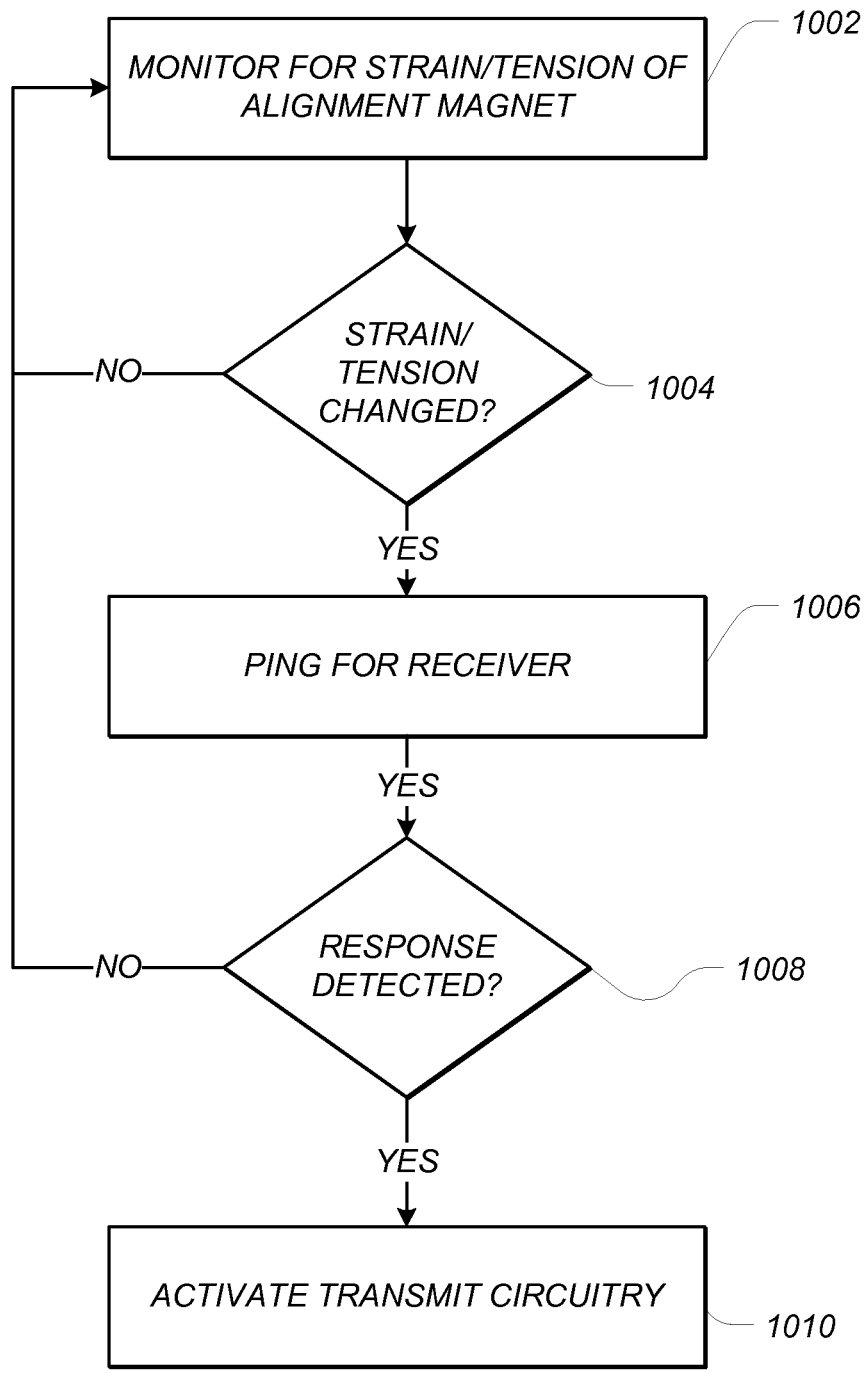
FIG. 10 depicts a flow chart illustrating example steps of a method of selectively activating transmit circuitry associated with an inductive power transmitter adapted to monitor for strain or tension changes within an alignment magnet within an inductive power transmitter resulting from attraction to an alignment magnet associated with an inductive power receiver.

FIG. 10 depicts a flow chart illustrating example steps of a method of selectively activating transmit circuitry associated with an inductive power transmitter adapted to monitor for strain or tension changes within an alignment magnet within an inductive power transmitter resulting from attraction to an alignment magnet associated with an inductive power receiver. The method may begin at 1002 in which a processor associated with an inductive power transmitter may monitor or more strain sensors coupled to an alignment magnet within a transmitter.

In many examples, a receiver may include an alignment magnet that is positioned to align with a corresponding alignment magnet within the transmitter. When the receiver is positioned nearby the transmitter, the alignment magnets may attract one another. In some examples, a sensor may be positioned above or below the alignment magnet within the transmitter such that when the magnets attract, the sensor experiences tension if positioned below or compression if positioned above. In other examples, two or more sensors may be used. The sensors may be affixed or otherwise coupled to the magnet or the housing of the transmitter using any suitable means.

The processor may monitor for a change in the tension or compression of the sensor in the current at 1004. If a change in the tension or compression of the sensor is not detected, the processor may continue monitoring. Alternately, if a change in the tension or compression of the sensor is detected, the method may continue at 1006, in which the processor may initiate a verification process. The verification process may attempt to verify that for a change in the tension or compression of the sensor is actually the result of the placement of an inductive power receiver on the inductive power transmitter. The verification process may begin at step 1006 in which the inductive power transmitter may ping for a receiver over, for example, a wireless communication channel as described with respect to the method illustrated by FIG. 4 or by periodically transmitting power and monitoring for a load to a transmit coil as described with respect to the method illustrated by FIG. 5. If, alternatively, the presence of the receiver is verified, transmit circuitry may be activated at 1010.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. An adaptive power control system for an electromagnetic induction power transfer apparatus comprising:
   a signal receiver;
   a sensor configured to detect the presence and absence of an electromagnetic induction power receiving apparatus;
   a power supply with an active state and an inactive state, configured to switch between the active state and the inactive state at a selectable duty cycle; and
   a power-transmitting inductor coupled to the power supply;
   wherein:
   the inactive state of the power supply is controlled at least in part in response to a signal received from the signal receiver; and
   the inactive state of the power supply is controlled at least in part in response to a signal received from the sensor.

2. The adaptive power control system of claim 1, wherein the power supply is set to the inactive state in the absence of a signal received from the signal receiver.

3. The adaptive power control system of claim 1, wherein the signal is received when the power supply is in the inactive state.

4. The adaptive power control system of claim 1, wherein the signal received from the signal receiver is a signal sent from an electromagnetic induction power receiving apparatus having a power-receiving inductor and positioned inductively proximate the power-transmitting inductor.

5. The adaptive power control system of claim 4, wherein the signal comprises a verification that the electromagnetic induction power receiving apparatus is prepared to receive power.

6. The adaptive power control system of claim 4, wherein the signal comprises a verification that the electromagnetic induction power receiving apparatus unable to receive power.

7. The adaptive power control system of claim 1, wherein the signal is received when the power supply in either the active state or the inactive state.

8. The adaptive power control system of claim 1, wherein the signal receiver is coupled to the power-transmitting inductor and configured to sense changes in inductive load to the power-transmitting inductor.

9. The adaptive power control system of claim 1, wherein the sensor comprises one or more magnetic field sensors.

10. The adaptive power control system of claim 1, wherein the sensor comprises one or more optical sensors.

11. The adaptive power control system of claim 1, wherein the sensor comprises one or more strain sensors coupled to an alignment magnet.

12. The adaptive power control system of claim 1, wherein the sensor comprises one or more accelerometers.

13. The adaptive power control system of claim 1, wherein the sensor comprises one or more capacitive sensors.

14. A method of activating a transmit circuitry associated with an inductive power transmission apparatus, the transmit circuitry comprising a transmit coil, the method comprising:
   providing an interface surface for mating to an inductive power receiving apparatus comprising at least one magnetic field source;
   monitoring the transmit coil for a current spike; and
   activating the transmit circuitry in response to the current spike.

15. The method of claim 14, further comprising:
   upon determining that a current spike has occurred, verifying that the current spike is associated with a magnetic field source associated with an inductive power receiving apparatus before activating the transmit circuitry.

16. A method of activating a transmit circuitry associated with an inductive power transmission apparatus, the transmit circuitry comprising a transmit coil, the method comprising:
   providing an interface surface for mating to an inductive power receiving apparatus comprising at least one magnetic field source;

monitoring with a processor one or more magnetic field sensors for an indication of a proximity of the magnetic field source; and activating the transmit circuitry in response to determining the proximity of the magnetic field source is at least lower than a selected threshold.

17. The method of claim 16, wherein the one or more magnetic field sensors comprise at least one of the group consisting of Hall sensors, reed switches, and giant magnetoresistance sensors.

18. A method of activating a transmit circuitry associated with an inductive power transmission apparatus, the transmit circuitry comprising a transmit coil, the method comprising:

providing an interface surface for mating to an inductive power receiving apparatus;

monitoring one or more proximity sensors for an indication of a proximity of the inductive power receiving apparatus to the interface surface;

determining if a proximity of a magnetic field source is at least lower than a selected threshold;

verifying that the inductive power receiving apparatus is ready to receive transmitted power; and activating the transmit circuitry.

19. The method of claim 18, wherein the one or more proximity sensors comprise at least one of the group consisting of Hall sensors, reed switches, giant magnetoresistance sensors, capacitive sensors, and optical sensors.

* * * * *